R. B. HARTMAN.
CONCRETE BUILDING CONSTRUCTION.
APPLICATION FILED AUG. 24, 1909. RENEWED JULY 6, 1918.
1,295,311.
Patented Feb. 25, 1919.
7 SHEETS—SHEET 1.
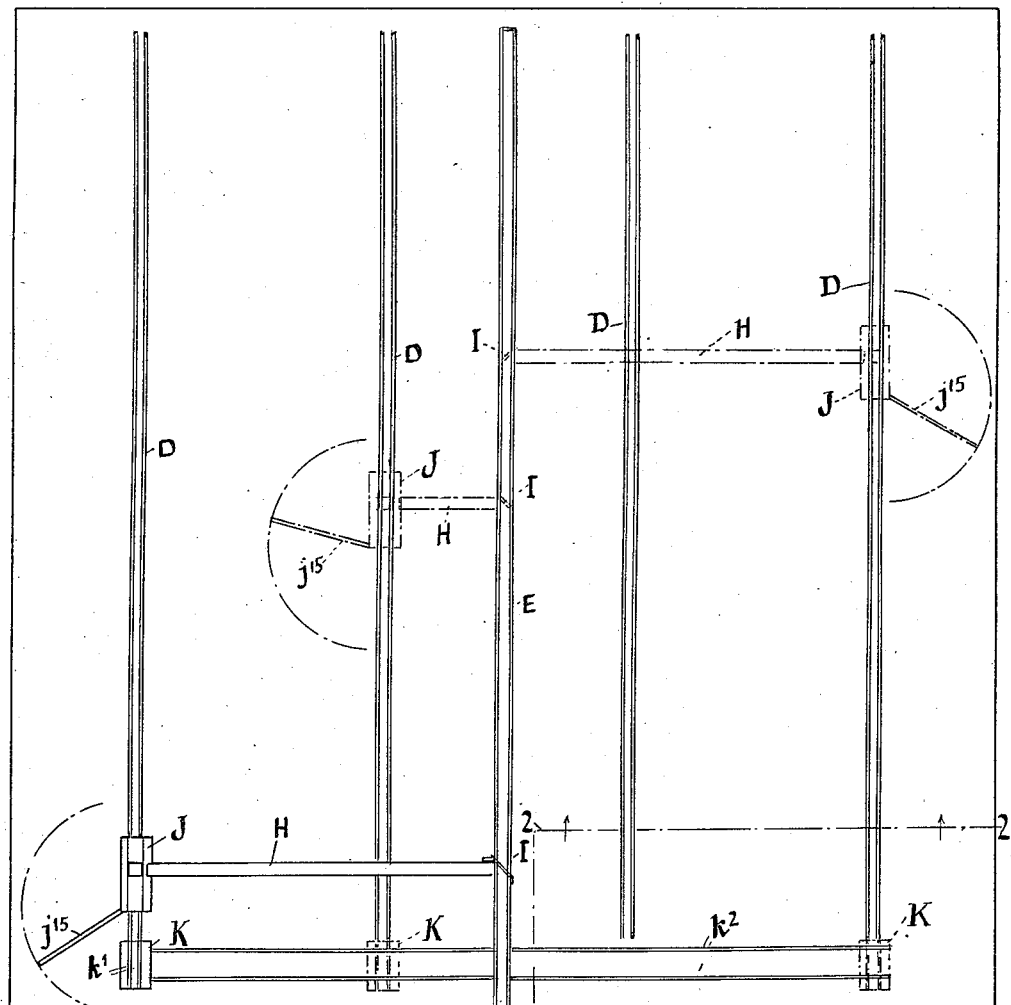
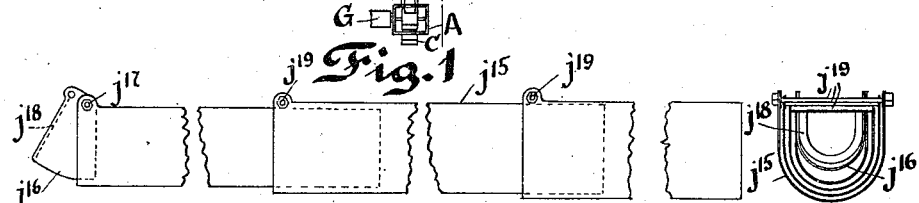

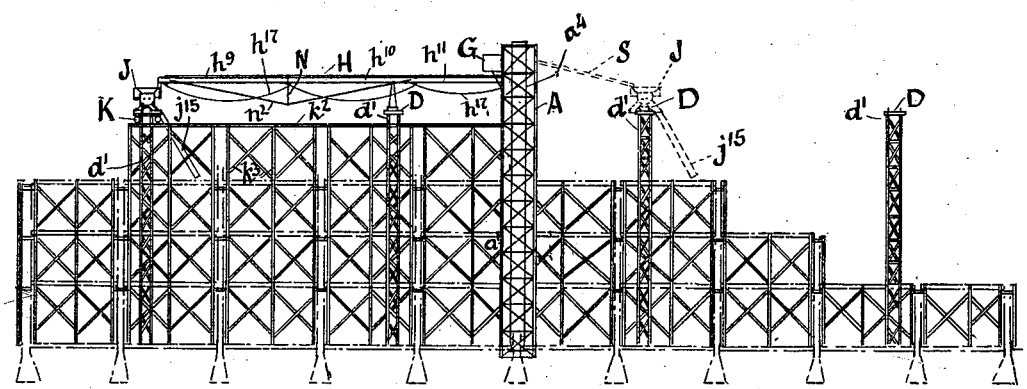
Fig. 2
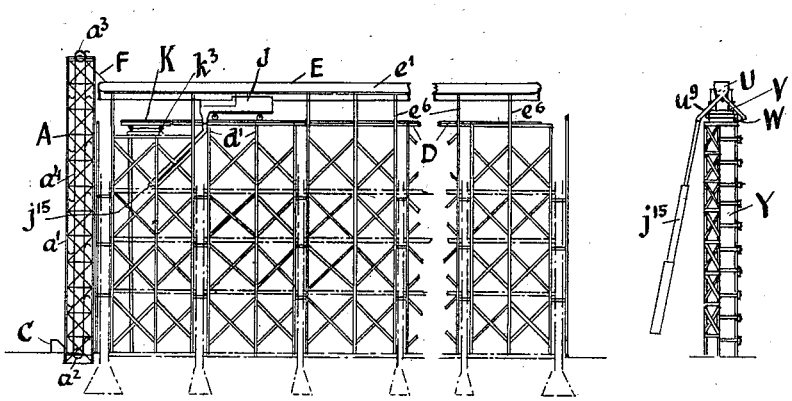
Fig. 3
Fig. 24

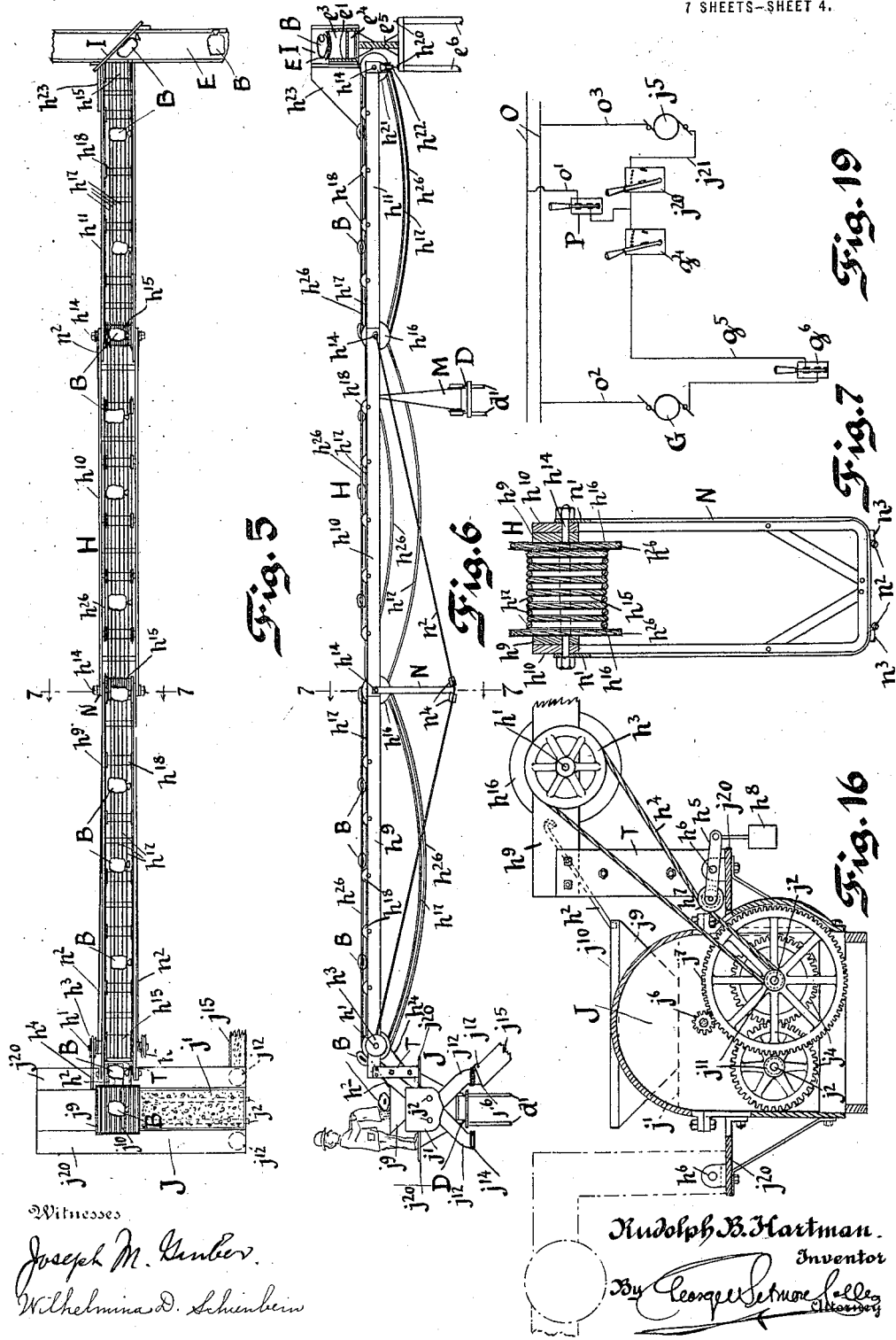

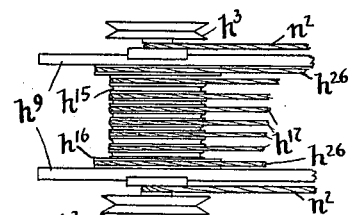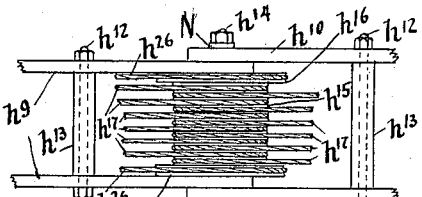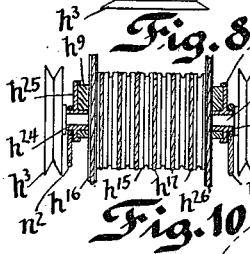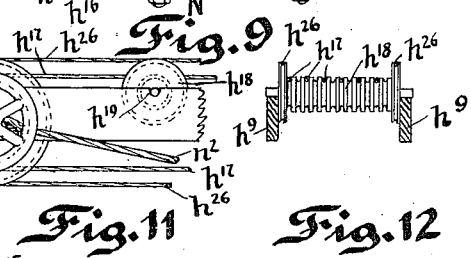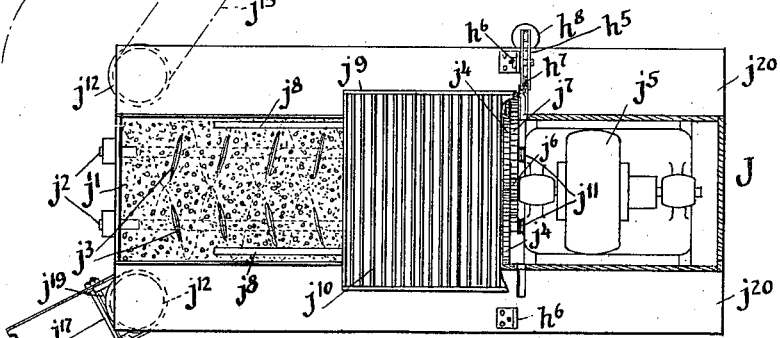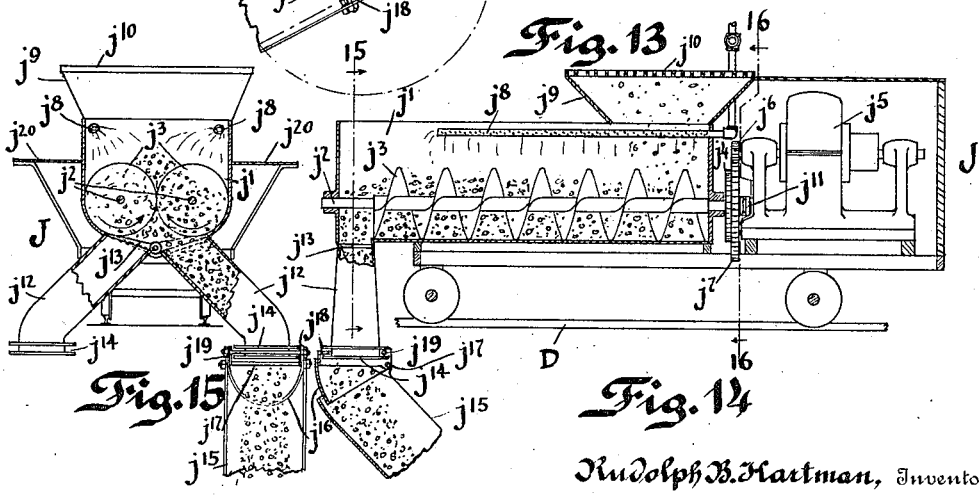

R. B. HARTMAN.
CONCRETE BUILDING CONSTRUCTION.
APPLICATION FILED AUG. 24, 1909. RENEWED JULY 6, 1918.

1,295,311.   Patented Feb. 25, 1919.
7 SHEETS—SHEET 7.

Witnesses
M. Blackburn
Joseph M. Gruber

Rudolph B. Hartman,
Inventor
By George Wetmore Colles
Attorney

UNITED STATES PATENT OFFICE.

RUDOLPH B. HARTMAN, OF MILWAUKEE, WISCONSIN.

CONCRETE BUILDING CONSTRUCTION.

1,295,311.   Specification of Letters Patent.   Patented Feb. 25, 1919.

Application filed August 24, 1909, Serial No. 514,390. Renewed July 6, 1918. Serial No. 243,704.

*To all whom it may concern:*

Be it known that I, RUDOLPH B. HARTMAN, of Milwaukee, Wisconsin, have invented certain Improvements in Concrete Building Construction, of which the following is a specification.

This invention relates to methods and apparatus for the construction of concrete buildings, and my object is in general to so improve upon those methods at present in use as to enable a concrete building to be constructed very much more rapidly than heretofore and with a much less expenditure for labor.

More specifically, my invention has relation to the method of delivering a concrete-mixture at a point where needed for casting it in the floor, wall and column-molds, and to dispense entirely with the present method of delivering it to the point wanted by means of cars, trolleys or wheel-barrows, which necessarily travel back and forth over the proper forms, and in so doing not only cumber the operations of casting by their presence, but by running off the ways laid for them are constantly disarranging the steel or breaking or injuring the forms, and besides have the disadvantage of being a very costly method of transportation because man power alone is used.

In my improved method I aim to dispense absolutely with wheelbarrows and hand-carts, as well as with all manual transportation whatever, and to deliver the dry concrete ready mixed from some point outside the building to the exact point upon the floor where it is wanted. Moreover I aim to accomplish this operation completely and automatically and with a minimum of labor involved. Further I aim to supply by my improved method very much greater volumes of concrete than is possible by the hand or wheelbarrow method, and so pour for example a complete floor in one day where under present methods it would require a week with the greatest amount of labor that can be put on the job.

The nature of my invention will be best understood by the detailed explanation of one example thereof, and to the end that it may be better understood, I have shown such an example in the accompanying drawings, wherein, Figure 1 is a plan view of a building of the larger size, showing the constructional apparatus employed in delivering the concrete, and with all the forms and other framework omitted for the sake of clearness;

Fig. 2 is an elevation of the building from that side which is at the bottom of Fig. 1; the left-hand half being shown in section on the plane 2;

Fig. 3 is an elevation of the building from the right-hand side of Fig. 1, a portion in the center being cut away so as to bring it within the limits of the sheet;

Fig. 5 is a plan-view of the subsidiary conveyer and mixer;

Fig. 6 is a side-elevation of the same, showing the main conveyer in cross-section;

Fig. 7 is a transverse section through the truss-joint of the subsidiary conveyer, on the plane 7 of Figs. 5 and 6;

Fig. 8 is a plan-view on a still larger scale of the driving-end of the subsidiary conveyer;

Fig. 9 is a plan-view of the joint between two sections of the subsidiary conveyer;

Fig. 10 is a transverse section through the driving-end of said conveyer, in the axial plane of the driving-shaft;

Fig. 11 is a side elevation thereof;

Fig. 12 is a transverse section through the conveyer showing the arrangement of the rollers;

Fig. 13 is a plan view of the mixer with a part of the outer casing broken away;

Fig. 14 is a longitudinal section through the same;

Fig. 15 is an end-elevation of the mixer, partly in section on the plane 15;

Fig. 16 is a transverse section of the mixer and connected parts on the plane 16;

Fig. 17 is a side view of the telescoping delivery chute or trough for the mixed concrete;

Fig. 18 is an end view of the same;

Fig. 19 is a diagram of the electrical connections between the motor-driving apparatus of the several parts of the system;

Fig. 24 is an end elevation of a construction-track supported by a row of column-forms built up in advance of the remaining forms for this purpose.

Figure 4:
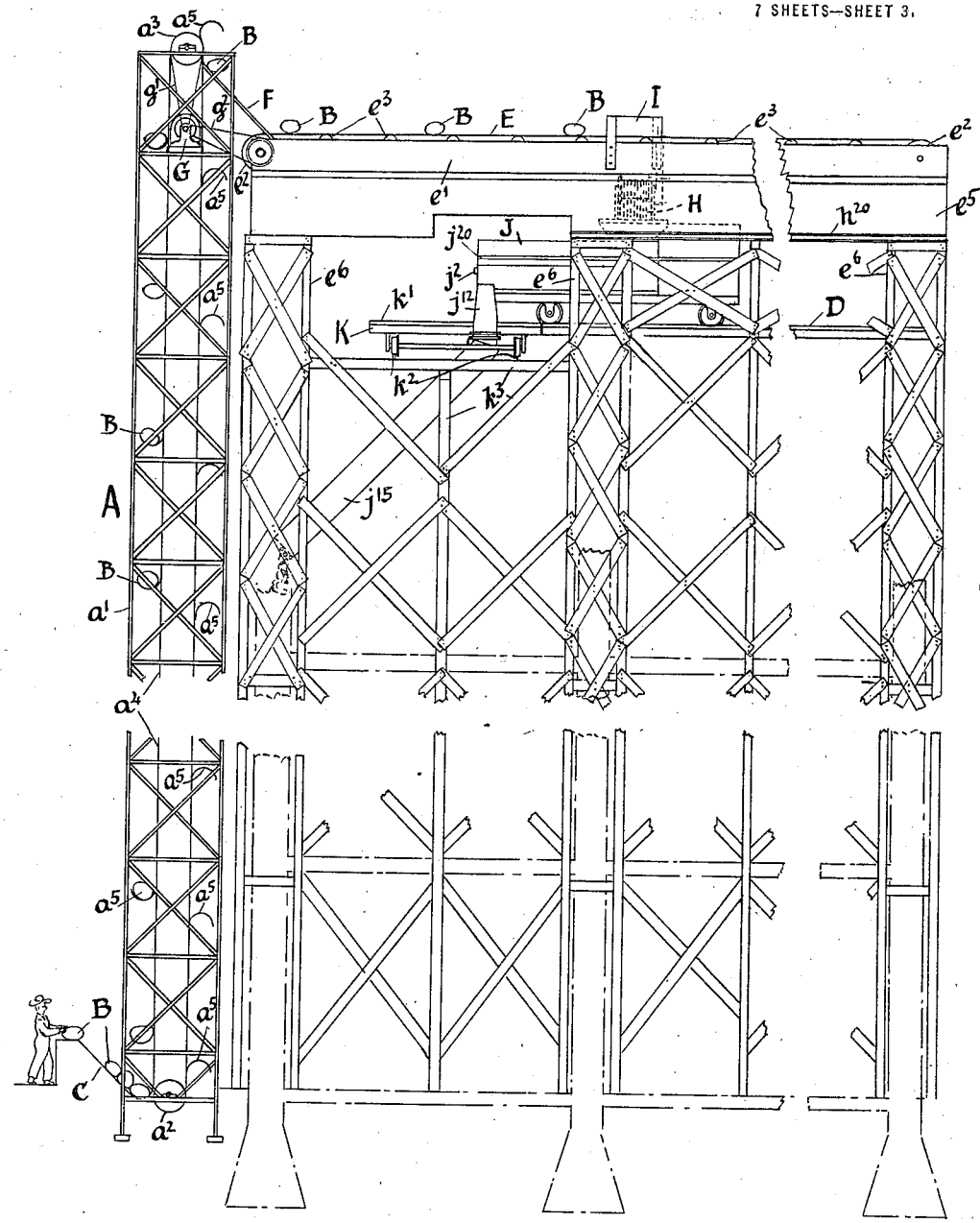
Fig. 4 is an elevation of the apparatus on the same plane as Fig. 3, with portions broken out to bring it within the limits of the drawing.

In there drawings every reference letter and numeral refers always to the same part.

The general arrangement of my system comprises, first, an elevator which carries the dry-mixed materials for the concrete in bags from the ground to a point at a suitable distance above the point where it is to be laid; secondly, a main conveyer adapted to receive the bags from said elevator and transport the materials laterally over the building area; thirdly, subsidiary or lateral conveyer adapted to receive the bags from the main conveyer and transport them in a lateral direction therefrom; fourthly, a traveling-mixer moving on one or more construction-tracks erected above the work for the purpose; and fifthly, a swinging delivery-chute or like means adapted to deliver the puddled concrete directly upon the point where it is to be ultimately placed. These several elements may be arranged in various ways according to the form of the building, the point at which the materials may be most conveniently assembled and delivered to the elevator, the shape and design of the building, and the judgment and convenience of the building-constructor. It should be understood therefore that in describing specific forms as hereinbelow, these are merely presented by way of illustration and not with the idea that they are the only forms that can be adopted to carry out my invention; however, it may be said that the preferred form shown is that which will be found most desirable for the average building, and contains features which form a part of my invention independently of other forms.

In Fig. 1 is shown the ground plan of a building supposed to be (to fix ideas) about two hundred feet square.

For the purposes of my invention an elevator or hoist A is erected at one side of the building and preferably in the center of that side; such elevator comprising a frame or scaffolding $a'$, pulleys $a^2$, $a^3$ mounted at top and bottom thereof, and in the belt or apron $a^4$ mounted on said pulleys, and buckets or cradles $a^5$ mounted at intervals along said apron and in shape adapted to receive and support the concrete bags B into which the materials of the concrete (except the water) are loaded for delivery. A delivery-chute C may be conveniently arranged at the base of the elevator in position for shooting the bags into position to be taken up and elevated by the cradles $a^5$, so that the workmen have simply to throw the bags into the chute and as fast as each bag is taken up the remainder will slide forward to place the next bag in position.

Over the floors and framework to be cast in concrete, the contractor will also erect a number of parallel tracks D, the same being supported in any convenient manner, as for example on pole-bents $d'$, said tracks being in the preferred form parallel to the sides adjacent to that on which the elevator is located; and a conveyer-belt E extending the complete length of the building parallel to the tracks D and midway between them is erected, so that one end comes adjacent to the elevator-belt $a^4$, from which it receives the bags B either through a slide F or in any other convenient manner. The conveyer-belt E is mounted on a frame $e'$ consisting of side-planks which carry the end-pulleys $e^2$ and rollers $e^3$, $e^4$, on which the upper and lower laps of the belt respectively rest, said frame $e'$ being supported through a beam $e^5$ (see Fig. 6) upon pole-bents $e^6$ or otherwise, for the purpose hereinafter described. Both the elevator-belt $a^4$ and the conveyer E may be driven through any suitable motor, preferably by means of an electric motor G connected with the two conveyers by belts $g'$ and $g^2$, so that the bags B are continuously and without manual assistance elevated and delivered to the conveyer E, from which they are thrown off upon the subsidiary or lateral belt H at any point desired by means of a movable throw-off plate I, which can be clamped in a suitable manner upon the side-planks $e'$. Upon the tracks D is mounted a mixer J which can be rolled to any point thereof; and to transport said mixer from one of the tracks D to another a transfer-table K carrying extensions $k'$ of the tracks D is mounted transversely thereto upon a second set of tracks $k^2$ supported on a suitable scaffolding $k^3$; so that it becomes an easy matter to transfer the mixer J to whatever point along the tracks D may be most immediately over the point where the mixed concrete is to be delivered. The mixer J, as herein constructed, comprises a mixing-tank $j'$ carrying a pair of shafts $j^2$, provided with helical blades $j^3$, which are geared together so as to rotate in opposite directions by gears $j^4$ at one end, and are driven by a motor $j^5$ connected to one of the shafts by means of gears $j^6$, $j^7$. Along the sides of the tank may run water-pipes $j^8$ which may be connected to any convenient source of water-supply so as to furnish water to the mixer at each step of the building operations, said pipes $j^8$ being perforated so as to distribute the water as equably as possible to the concrete, which is turned over and mixed by the helical plates $j^3$ and at the same time conveyed from the infeed to the delivery-end of the tank. In describing the hereinabove arrangement of the mixing-tank I do not wish it understood that my invention is confined to this arrangement, as other types of tank may be used; but the type described is one of those best adaptable to the purposes of my invention.

Over the mixing-tank $j'$ at the intake-end thereof is located a hopper $j^9$, across the mouth of which is a grille-work or grizzly $j^{10}$, adapted to receive the bags directly upon it as they are delivered from the lateral conveyer H. The delivery-end of this conveyer is provided with a post or pedestal T which rests upon the side of the mixer, and a short slide $h^2$ to prevent the bags from falling through the open space between the conveyer and mixer. The conveyer has its driving-shaft $h'$ at this end, and a driving-pulley $h^3$ mounted thereon which is connected by a driving-rope $h^4$ to one of the shafts $j^2$ of the mixer, each of which shafts is provided with a rope-sheave $j^{11}$ to receive the rope $h^4$, either one of such pulleys being used depending on which side of the main belt E the mixer happens to be located on at the time. A belt-tightener consisting of a lever $h^5$, pivoted at $h^6$ and carrying a tightener-roller $h^7$ on one end and weight $h^8$ on the other may be conveniently employed to take up the varying slack of the rope due to unevenness in the distance between the conveyer and mixer.

The mixer has at its opposite or delivery-end two delivery-chutes $j^{12}$ which are used alternatively according to which side of the track the concrete is to be delivered on, and a hinged valve-plate $j^{13}$ is used to close the chute $j^{12}$ not in use and throw the mixed concrete into the other. On the lower end of each chute $j^{12}$ is a grooved ring $j^{14}$ providing for the swiveled delivery-trough or chute $j^{15}$, which is provided at its upper end with an elbow $j^{16}$ to which it is pivoted by a bolt $j^{17}$, said elbow having an external U-shaped flange $j^{18}$ adapted to engage in the grooved ring $j^{14}$, and a bolt $j^{19}$ passing from side to side of the elbow and adapted to hold the flange $j^{18}$ in engagement with the ring and to clamp it in position if desired. By this arrangement it will be seen that not only can the chute $j^{15}$ be swung in a vertical plane so as to deliver the concrete at a greater or less distance from the mixer, but it can also be swung about a vertical axis so that it can deliver the concrete to any point within a given radius of the mixer; and such radius will naturally depend upon the height above the work at which the mixture is placed and the degree of liquidity of the mixed concrete. The chute $j^{15}$ will generally be constructed in telescoping sections as illustrated in Figs. 17 and 18, each one clamped to the next one by a bolt $j^{19}$ or any other suitable means so that the length of the chute can be varied as desired. Platforms $j^{20}$ are erected on the mixer at the sides thereof for the operatives who manipulate the bags B and empty them into the hopper $j^9$.

To adapt it to the purposes of ready erection and also of alteration in length to conform with the different distances of the tracks D from the main conveyer, the construction of the lateral conveyer H is of peculiar importance. As herein shown it is built in three sections $h^9$, $h^{10}$ and $h^{11}$, each made up of lateral planks secured in parallel relation by spacing-bolts $h^{12}$ and distance-pieces $h^{13}$ at suitable intervals. At their ends, except the driving-end of the section $h^9$, are mounted stationary axles $h^{14}$ each carrying a grooved sheave $h^{15}$ provided with a number of rope-grooves of equal diameter, and two end-sheaves $h^{16}$ of larger diameter. Over the sheaves $h^{15}$ pass the conveyer-ropes $h^{17}$, one set of ropes to each section, the lower laps hanging free in ordinary cases, as shown in the drawings. A plurality of grooved supporting-rolls $h^{18}$ are mounted in notches $h^{19}$ along the upper edges of the frame-planks in order to support the upper or conveying laps of the ropes $h^{17}$ and prevent them from separating. The number of rope-grooves in the sheaves $h^{15}$ is naturally twice the number of ropes in any one section of the conveyer, the ropes of the two sections alternating; and upon the shaft $h'$ is nonrotatably mounted a similar sheave $h^{15}$ for the ropes of that section, so that the section $h^{10}$ is driven from the section $h^9$, and the section $h^{11}$ in turn from the section $h^{10}$.

The end of the conveyer H adjacent to the main conveyer is movably supported upon one of two rails $h^{20}$ which are supported upon the pole bents $e^6$ below the main conveyer; each of the side-planks of the section $h^{11}$ being provided on its end with a metal casting $h^{21}$ carrying a flanged roller $h^{22}$ rolling upon the rail; so that the end of the conveyer lies directly below the main conveyer, and a side-shield $h^{23}$ may be provided for the purpose of preventing any possibility of the bags overshooting and falling beyond the same.

When the mixer is on one of the tracks D nearest to the conveyer E only the section $h^{11}$ is necessary, which accordingly may be detached from the rest of the conveyer and be driven in the same manner as the section $h^9$; in this case the fixed axle $h^{14}$ will be taken out and replaced by the shaft $h'$ and driving-pulley $h^3$. When however the mixer is being used upon the track D farthest from the conveyer E, then all three sections of the conveyer H must be used, and for this purpose it is necessary to support them in line. A small truck M is used to form a rest for the section $h^{10}$ near the joint, and the two sections $h^9$ and $h^{10}$ are kept in line by a collapsible truss-work, consisting as shown of a U-frame N (which may be conveniently made from angle-iron or the like) whose ends $n'$ have holes through which passes the bolt $r^{14}$; and a pair of truss-ropes or cables $n^2$ having eyes formed at their ends which pass respectively over the bolt $h^{14}$ at the joint between the sections $h^{10}$ and $h^{11}$ and over flanges $h^{24}$ formed on the journal castings $h^{25}$ for the shaft $h'$. Small blocks $n^3$ may be secured to the frame N to form side-abutments for the cords $n^2$, and blocks $n^4$ may be secured to the cords $n^2$ on either side of the casting N to prevent it from collapsing sidewise when in use. This arrangement is for the purpose of enabling the conveyer H to be transported in convenient-sized portions and to be readily erected and dismantled; and it will be seen that the two sections $h^9$ and $h^{10}$ thereof can be readily collapsed and folded together by simply raising the joint $h^{14}$, disconnecting the ropes $n^2$ from the frame N, and folding the latter sidewise.

It will be observed that, in addition to the main supporting-cords $h^{17}$ of the conveyer, other cords $h^{26}$ are used at the sides which run at a higher elevation. These cords, while not absolutely necessary to operation, are desirable to prevent the bags from falling sidewise. The sheaves $h^{16}$ which support them need not be driven but preferably run idle, and the cords $h^{26}$ belonging to the middle section do not run over the end sheaves $h^{16}$ as there is but one pair of sheaves to each pulley. This is shown in Figs. 5 and 6.

The entire apparatus can be operated by two men stationed at the mixer who start and stop both motors and empty out the bags as fast as they arrive upon the grizzly $j^{10}$. To enable this to be accomplished I have shown the electrical connections in Fig. 19. Both motors G and $j^5$ are connected in parallel to the main circuit wires O through leads $o'$, $o^2$, and $o^3$, in the first of which is arranged a cutout switch P, stationed at the mixer, by pulling which the entire hoisting and conveying mechanism can be instantly brought to a standstill. In addition two motor-starters $g^4$ and $j^{20}$ are used in the respective motor-circuits $g^5$ and $j^{21}$, by means of which each of the motors can be started separately. Besides the above, a cutout-switch $g^6$ is stationed at the base of the elevator A so that, in case of accident occurring below, the elevator and conveyer E can be stopped independently of the switchboard at the mixer by pulling this switch.

Figures 20, 21:
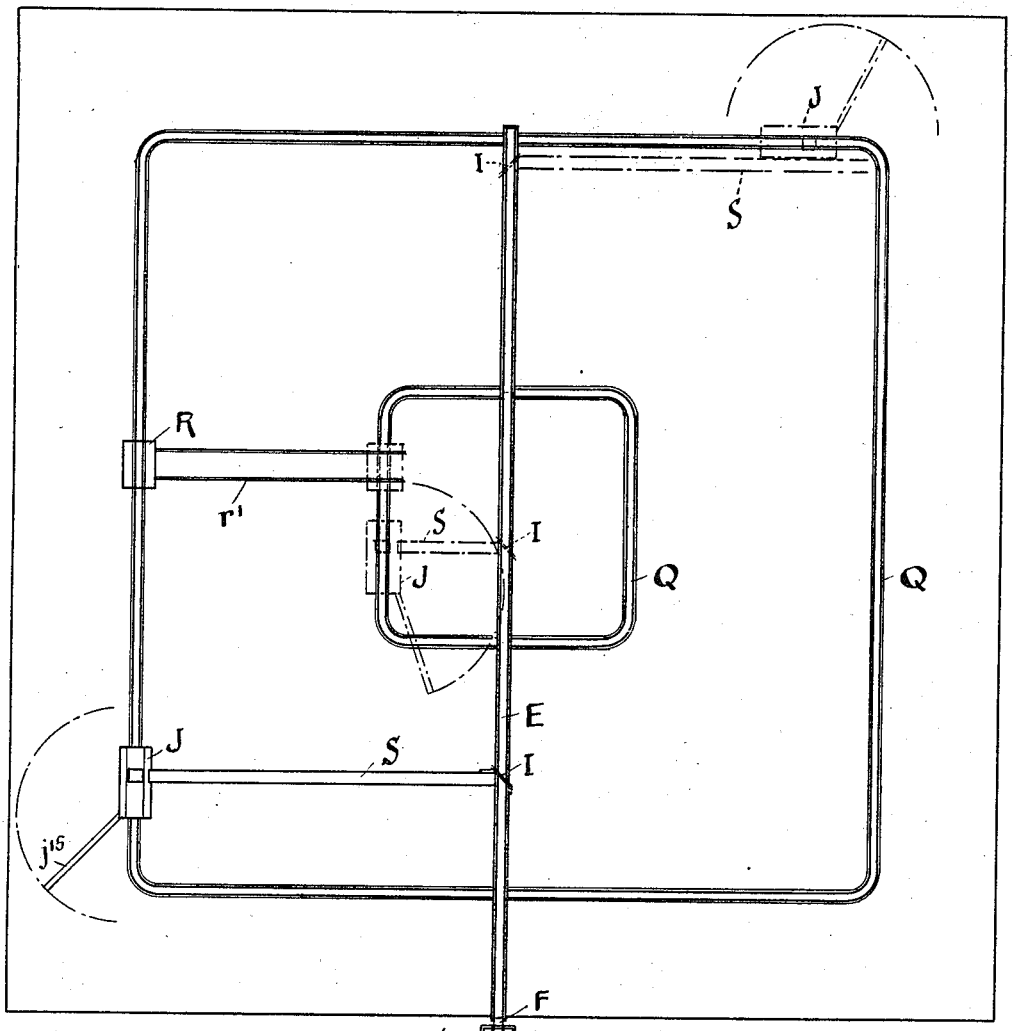
Fig. 20 is a plan-view of a different arrangement of belts and tracking which may be adopted in certain cases.
Fig. 21 is a partial elevation thereof from the lower side of Fig. 20.

In the alternative construction of Figs. 20 and 21 are used, in place of the parallel tracks D, a pair of endless tracks Q which parallel the four sides of the building at suitable distances apart and are connected by a transfer table R running on tracks $r'$. Across the center of this runs the main conveyer E, which, together with the elevator A, is the same as in the previous construction. While I may also in this construction use a lateral conveyer similar to the conveyer H, I have shown instead, to illustrate possibilities, a skid or slideway S to which the bags are delivered by the conveyer E and down which they slide to the mixer J.

The question as to the relative advantages of the driven conveyer H and the skid or slideway gravity conveyer S is to be answered largely in respect of the size of building being constructed, the distance of the tracks D from the conveyer E, and the means and facilities of the contractor. Of course the farther the mixer D is from the conveyer E, the higher must the elevator tower A be erected in order to provide for sufficient slope for the slideway, and this means also proportionately greater power for hoisting. Such a construction would therefore not be desirable upon large buildings, as leading to too great a height of elevator and conveyer, but on small buildings, or where the mixer-tracks are located not very far from the driven conveyer E, the slideway or gravity conveyer S would offer the greatest advantages as being the simplest and cheapest and most quickly erected and moved from point to point.

The practical solution of the question in a large building will often be found to lie in the use of the driven conveyer H for the distant tracks D and the skid or gravity-conveyer S for the inner tracks. This combination is illustrated in Fig. 2 of the drawings, the use of the skid being shown on the right in dotted lines.

In practice I propose to adjust the apparatus vertically as the building operations proceed, erecting my apparatus in the first place at a sufficient height to pour several floors, and when these are poured the apparatus is adjusted vertically by raising it a further distance sufficient for several more floors, so that a minimum of rigging only is necessary, and the delivery and pouring of the concrete is limited in fact only by the size and capacity of the mixer M and of the elevator and conveyers. This application is shown on the right of Fig. 2, in which the form-scaffolding over the right-hand portion of the building has only reached the second story which is ready to be poured by use of the right-hand outer tracks D; the third story is ready for pouring in the next adjacent portion on the left, and the fourth story in the portion under the inner tracks D. As each floor is completed, the scaffolding is erected immediately over it for the next floor, without removing the floor forms or waiting for the concrete to set; and so on upward.

Figure 22:
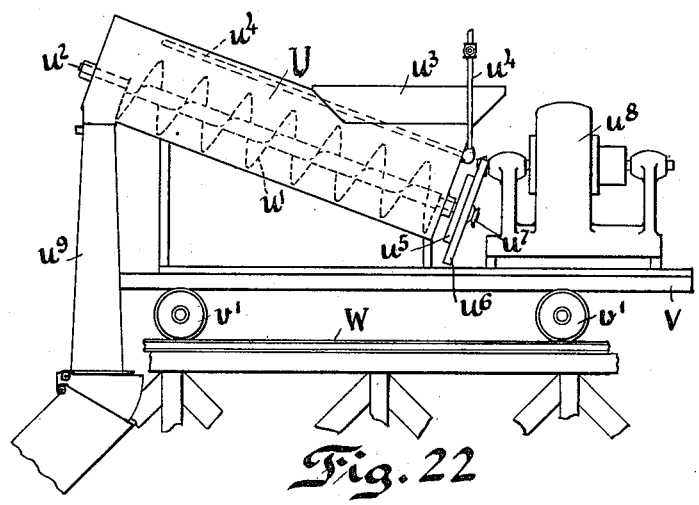
Fig. 22 is a side elevation of an improved form of mixer adapted to use with a broad-gage construction-track.
Figure 23:
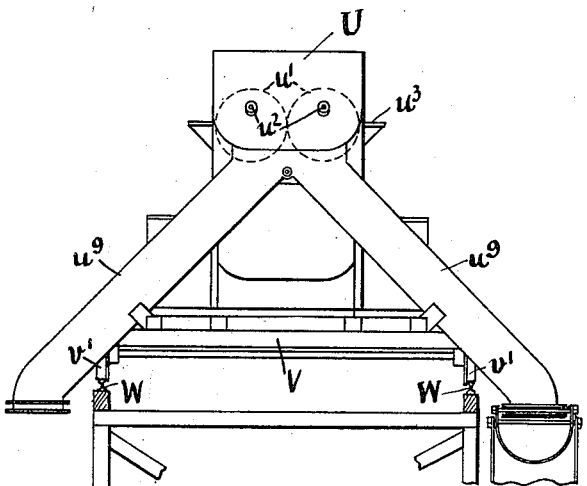
Fig. 23 is an end elevation of the same.

The form of mixer shown in Figs. 13 to 16 is objectionable where it is desired to use a broad-gage track, because of the branch-spouts $j^{12}$ coming in the way of the latter. To provide for a broad-gage track I construct the mixer as illustrated in Figs. 22 and 23, wherein the mixing-tank U containing the propelling and agitating devices $u'$ turning on the longitudinal shafts $u^2$ is arranged in tilted position, supported on a platform V which carries wheels $v'$ rolling upon the broad-gage track W. The infeed-hopper $u^3$, water-feed pipes $u^4$, gearing $u^5$, $u^6$, rope-sheaves $u^7$, and motor $u^8$ are arranged all substantially as in the previously described form; and it will be noted that the branched delivery-chutes $u^9$ which conduct the mixed concrete from the raised end of the mixer are in so far elevated above the track that they can spread a sufficient distance to permit of a very broad gage (for example 6 to 8 feet) of track being used.

From the above description it will be readily seen that my invention will assume a variety of forms all embodying the same principles and that a great number of changes and modifications are possible in the nonessentials without departing from the spirit of my invention, the scope of which is particularly defined in my claims.

Wherever it is convenient to locate the tracks W of Figs. 22 and 23 (corresponding to tracks D of Fig. 2) immediately over any tier of columns, I propose to utilize the column-forms Y in whole or in part to support the tracks D, thus saving the necessity of special scaffolding, or using the latter in conjunction with the column-forms, which are of course in that case built up in advance to the level of the tracks so as to support the same. This is illustrated in Fig. 24.

Having thus described my invention, what I claim as new and desire to secure by Letters Patent is:

1. A concrete supplying apparatus for mixing or puddling the concrete at the top of a rising structure, comprising an elevator for lifting the dry material, a conveyer extending substantially horizontally from the elevator and vertically adjustable above the completed portion of the structure, a mixer above the completed portion of the structure for receiving the dry material from the conveyer, means to deliver water to the mixer at each stage of the operations as it is moved during the upward progress of the structure, and a chute extending from the mixer to the place of casting.

2. A concrete supplying apparatus for mixing the concrete at the top of a rising structure, comprising an elevator for lifting the dry material, conveying mechanism extending from the elevator substantially in a horizontal direction above the completed portion of the structure, a conveyer adjustable along said horizontal conveying mechanism, a mixer above the completed portion of the structure adapted to receive the dry concrete material from said conveyer, means for supplying water to the mixer at each stage of the operations as it is raised during the progress of the building and a chute extending from the mixer to the place of casting.

3. A concrete supplying apparatus for mixing or puddling the concrete at the top of a rising structure, comprising an elevator for lifting the dry material, a conveyer extending substantially horizontally from the elevator above the completed portion of the structure, an elevated runway, a mixer movable along said runway and adapted to receive the dry material from the conveyer, means to deliver water to the mixer at each stage of the operations as it is moved during the upward progress of the structure, and a chute extending from the mixer to the place of casting.

4. A concrete supplying apparatus for mixing the concrete at the top of a rising structure, comprising an elevator for lifting the dry material, conveying mechanism extending from the elevator substantially in a horizontal direction above the completed portion of the structure, a conveyer adjustable along said horizontal conveying mechanism, a track or runway extending substantially parallel with said conveying mechanism, a mixer movable along said track and adapted to receive the dry material from said conveyer, means for supplying water to the mixer at each stage of the building operations, and a chute extending from the mixer to the place of casting.

5. A concrete supplying apparatus for mixing the concrete at the top of a rising structure, comprising an elevator for lifting the dry material, conveying mechanism extending from the elevator substantially in a horizontal direction above the completed portion of the structure, a plurality of tracks or runways, extending substantially parallel with said conveying mechanism, a mixer adapted to move upon said tracks, means for transferring the mixer from one track to another, a conveyer adjustable along said conveying mechanism to transfer the dry concrete material from the latter to the mixer in its different positions, means for supplying water to the mixer at each stage of the building operations, and a chute extending from the mixer to the place of casting.

In witness whereof I have hereunto set my hand this 23rd day of April, 1909.

RUDOLPH B. HARTMAN.

Witnesses:
RICHD. RIESEN,
A. E. STEIN.